US006935979B2

(12) United States Patent
Ma et al.

(10) Patent No.: US 6,935,979 B2
(45) Date of Patent: Aug. 30, 2005

(54) TRANSMISSION MECHANISM WITH A DIFFERENTIAL MECHANISM

(75) Inventors: Weijin Ma, Xinjiang (CN); Mingxue Yang, Xinjiang (CN); Yujiang Wang, Xinjiang (CN); Yingpu Wang, Xinjiang (CN); Bin Liang, Xinjiang (CN); Yongge Fan, Xinjiang (CN); Wenbin Pan, Xinjiang (CN); Feng Gao, Beijing (CN)

(73) Assignee: Xinjiang Shengsheng Co. Ltd., Xinjiang (CN)

( * ) Notice: Subject to any disclaimer, the term of this patent is extended or adjusted under 35 U.S.C. 154(b) by 74 days.

(21) Appl. No.: 10/705,998

(22) Filed: Nov. 12, 2003

(65) Prior Publication Data

US 2005/0097975 A1 May 12, 2005

(51) Int. Cl.[7] .............................................. F16H 37/08
(52) U.S. Cl. ...................................... 475/198; 475/243
(58) Field of Search ............................... 475/198, 203, 475/206, 243; 180/247

(56) References Cited

U.S. PATENT DOCUMENTS

| 1,480,856 | A | * | 1/1924 | Enochs | 475/198 |
| 1,742,744 | A | * | 1/1930 | Wyman | 475/198 |
| 2,242,605 | A | * | 5/1941 | Casner | 475/243 |
| 2,537,060 | A | * | 1/1951 | Keese | 475/198 |
| 2,674,892 | A | * | 4/1954 | Keese et al. | 475/198 |
| 4,299,140 | A | * | 11/1981 | Kako et al. | 475/198 |
| 6,634,979 | B1 | | 10/2003 | Quaife | 475/249 |
| 6,843,748 | B2 | * | 1/2005 | Ma et al. | 475/206 |

* cited by examiner

*Primary Examiner*—Sherry Estremsky
(74) *Attorney, Agent, or Firm*—Knobbe, Martens, Olson & Bear, LLP

(57) ABSTRACT

A transmission mechanism with a differential mechanism of an automotive vehicle comprises a driving power input shaft, a propeller shaft, a core shaft, two rear wheel output shafts, two front wheel output shafts, and a caseless differential mechanism including a left side bevel gear, a planetary gear bracket and a right side bevel gear. The performance of the automotive vehicle equipped with the transmission mechanism of the invention can be improved.

14 Claims, 2 Drawing Sheets

TRANSMISSION MECHANISM WITH A DIFFERENTIAL MECHANISM

BACKGROUND OF THE INVENTION

1. Field of the Invention

The present invention relates to a transmission mechanism of automotive vehicles, and more particularly to a transmission mechanism with a caseless differential mechanism.

2. Description of the Related Art

Conventionally, two differential mechanisms of prior art are disposed on the front axle and rear axle. As a result, the transmission mechanism of prior art is of a large size, a complex structure and a relatively higher cost of manufacturing, and makes a clearance between the chassis of the automotive vehicle and the ground decreased. When an automotive vehicle equipped with the transmission mechanism encounters weaker roads, such as loose soil, foothill and the like, wheels of the automotive vehicle may lose adhesions to the ground to cause skidding.

Hence, a transmission mechanism that overcomes the above-mentioned problems is desired.

SUMMARY OF THE INVENTION

Accordingly, an object of the present invention is to provide a transmission mechanism that overcomes the shortcomings in the prior art.

In order to achieve the above-mentioned object, a transmission mechanism for an automotive vehicle of the present invention comprises a first gear connected with a motor of the automotive vehicle; a propeller shaft, on which a sliding gear and a second gear are mounted; a differential mechanism including a left side bevel gear, a planetary gear bracket and a right side bevel gear; a core shaft passing through the differential mechanism; a dual tandem gear mounted on the core shaft; a third gear mounted on the core shaft and meshing with the second gear; two rear wheel output shafts disposed in parallel below the core shaft; a fourth gear and a fifth gear mounted on the two rear wheel output shaft, respectively, and engaged to the right side bevel gear and the left side bevel gear, respectively; and two front wheel output shafts removably connected with the two rear wheel output shafts, respectively. The sliding gear can be regulated to engage either the first gear or the dual tandem gear so that the propeller shaft can obtain different rotate speeds.

In one embodiment of the present invention, the dual tandem gear has a larger gear and a smaller gear, and the sliding gear has a first outer gear and an inner gear, wherein the larger gear can engage the first gear and the sliding gear can be regulated to engage the smaller gear with the first outer gear or to engage the first gear with the inner gear.

In another embodiment of the present invention, the two front wheel output shafts are connected with the two rear wheel output shafts by two overrunning clutches, respectively.

In further embodiment of the present invention, both of the two clutch members is overrunning clutch, such as a friction sprag type one way overrunning clutch and a roller type one way overrunning clutch.

Other objects, features and advantages of the present invention will become apparent from the following detailed description in conjunction with the accompanying drawings.

DETAILED DESCRIPTION OF THE PREFERRED EMBODIMENT

The present invention will be further described below with reference to the drawings.

Figure 1:
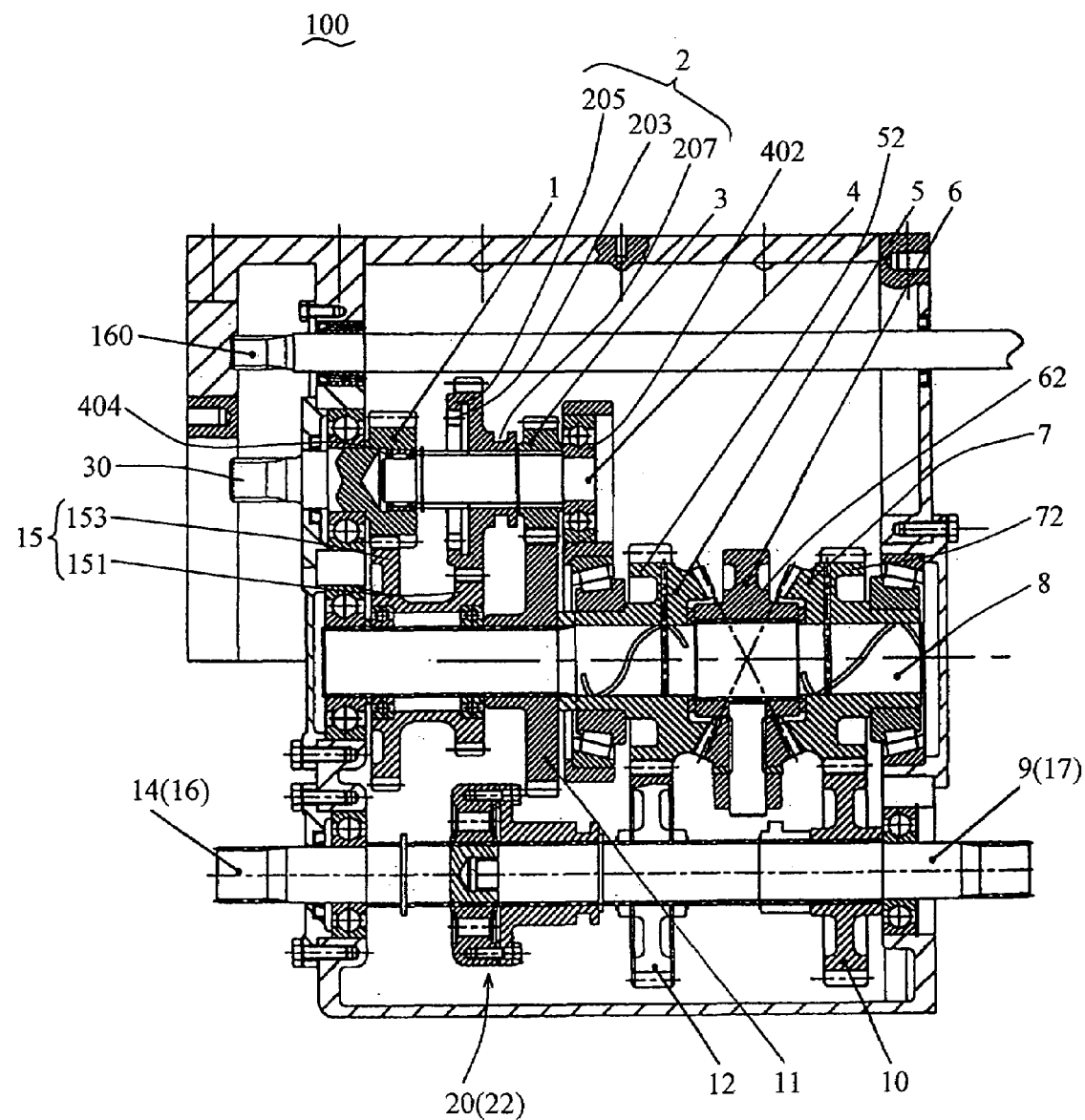
FIG. 1 is a schematic plan view of a transmission mechanism in accordance with the present invention.
Figure 2:
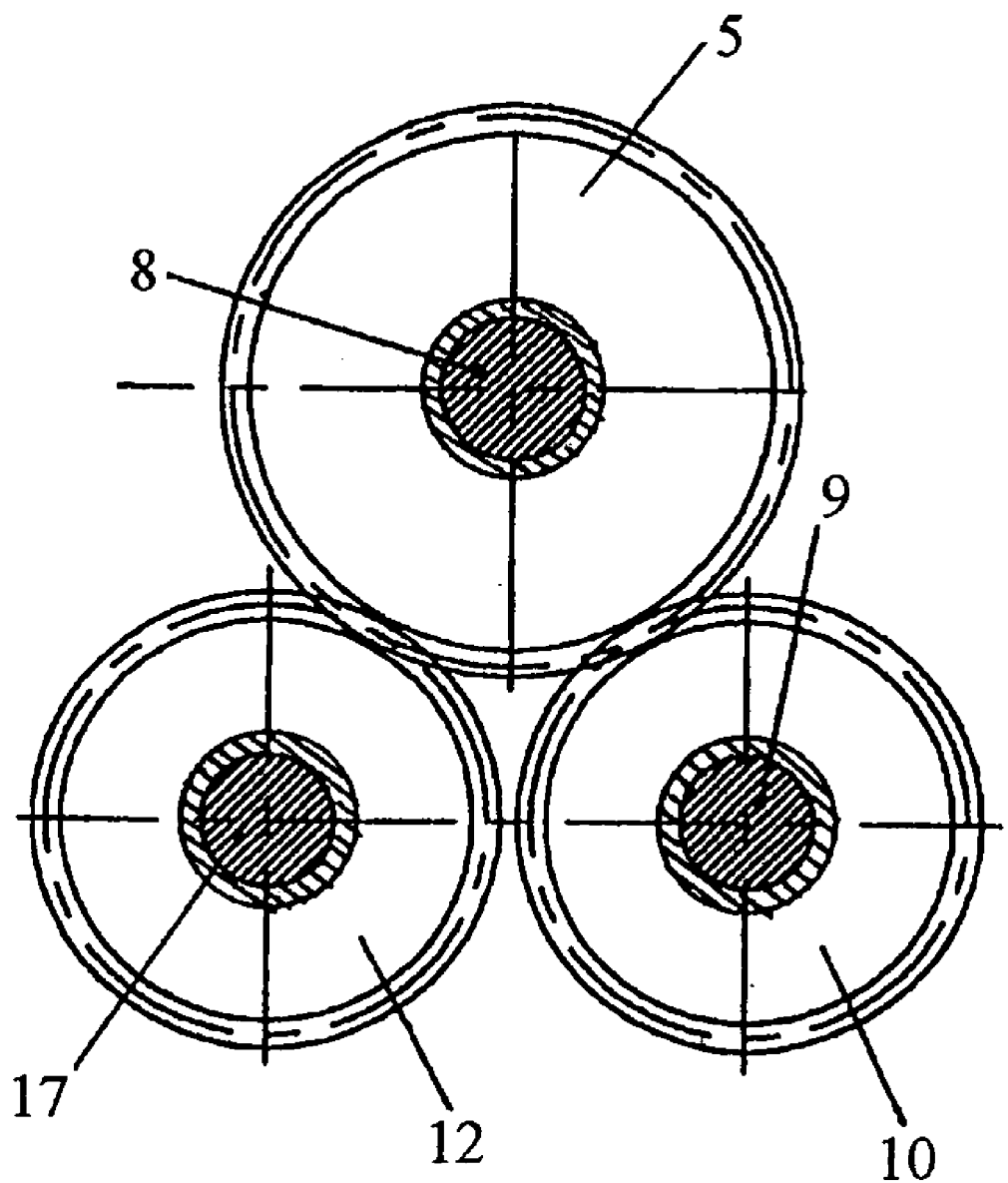
FIG. 2 is a schematic and sketching side view showing the location of shafts of the transmission mechanism as shown in FIG. 1.

Referring to FIGS. 1 to 2, a transmission mechanism 100 of an automotive vehicle in accordance with the present invention comprises a driving power input shaft 30, a propeller shaft 4, a core shaft 8, two rear wheel output t shafts 9 and 17, two front wheel output shafts 14 and 16, and a caseless differential mechanism 6 including a left side bevel gear 5, a planetary gear bracket 62 and a right side bevel gear 7.

The driving power input shaft 30 is connected with an engine (not shown) of the automotive vehicle. A first gear 1 is mounted on the input shaft 30 via splines. One end of the propeller shaft 4 is mounted within the first gear 1 via a roller bearing 404, and the other end of the propeller shaft 4 is mounted within a bearing bracket 402. A sliding gear 2 is slidably mounted on the propeller shaft 4 via splines and provides a first outer gear 205 and an inner gear 203 which can mesh with the first gear 1. A recess 207 is provided at the outer surface of the sliding gear 2 to accommodate a fork of a clutch of the automobile vehicle (not shown). A second gear 3 is also mounted on the propeller shaft 4 via splines close to the bearing bracket 402.

Elements of the caseless differential mechanism 6 used in the invention are the same as those in the prior art except those specifically described herein. A dual tandem gear 15 having a larger gear 153 and a smaller gear 151 is mounted on the core shaft 8 via ball bearings. The gear 153 meshes with the first gear 1. The sliding gear 2 can be regulated to either engage the smaller gear 151 or the first gear 1. A third gear 11 is mounted on the core shaft 8 via splines and meshes with the second gear 3. The left side bevel gear 5 having a second outer gear 52 and the right side bevel gear 7 having a third outer gear 72 are slidably mounted on the core shaft 8.

The two rear wheel output shafts 9 and 17 are disposed in parallel below the shaft 8, and connected with two rear wheels (not shown) of the automotive vehicle, respectively. A fourth gear 10 and a fifth gear 12 are mounted on the two rear wheel output shaft 9 and 17 via splines and mesh with the third outer gear 72 and the second outer gear 52, respectively.

The two front wheel output shafts 14 and 16 are connected with two front wheels (not shown) of the automotive vehicle, respectively. Two clutch members 20 and 22 including but not limited to an overrunning clutch, such as a friction sprag type one way overrunning clutch and a roller type one way overrunning clutch are mounted on the rear wheel output shafts 9 and 17 via splines that are detachably connected with the two front wheel output shafts 14 and 16, respectively.

It is to be understood the transmission mechanism 100 further comprises an additional driving power input shaft 160 in order to meet additional functionality.

The operation of the transmission mechanism 100 of the present invention will now be described as follows. The driving power is first transmitted to the driving power input shaft 4 through the sliding gear 2. The sliding gear 2 can be regulated to mesh with either the first gear 1 or the smaller gear 151 of the dual tandem gear 15 to make the shaft 4 obtain different rotating speeds. In any case, the second gear 3 is driven to rotate, and then the third gear rotates.

The core shaft 8 is driven by the third gear 11. Then, the core shaft 8 drives the planetary gear bracket 62 to rotate so as to drive the left side bevel gear 5 and the right side bevel gear 7 to rotate. Thus, two rear wheel output shafts 9 and 17 can be driven by the fourth gear 10 and the fifth gear 12, respectively. When the two front wheel output shafts 14 and 16 are connected with the two rear wheel output shafts 9 and 17 via the two clutch members 20 and 22 respectively, the four shafts 9, 17, 14 and 16 can be driven at the same time. If one of the two clutch members 20 and 22 is detached, the three shafts 9, 17, 14 or 9, 17, 16 can be driven at the same time. If both of the two clutch members 20 and 22 are detached, the two shafts 9 and 17 can be driven at the same time.

In contrast to the prior art, the transmission mechanism of the present invention makes use of a caseless differential mechanism to drive four wheels instead of two differential mechanisms of the prior art disposed on the front axle and the rear axle. As a result, the transmission mechanism is compact and inexpensive, and increases the clearance between the chassis of the automotive vehicle and the ground. The transmission mechanism of the present invention can lock the two wheels at the same side by connecting the rear wheel input shaft with the front wheel input shaft by the clutch member. Thus, the performance of the automotive vehicle is improved.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism of an automotive vehicle comprising:
    a first gear connected with a motor of the automotive vehicle;
    a propeller shaft, on which a sliding gear and a second gear are mounted;
    a differential mechanism including a left side bevel gear, a planetary gear bracket and a right side bevel gear;
    a core shaft passing through the differential mechanism;
    a dual tandem gear mounted on the core shaft;
    a third gear mounted on the core shaft and meshing with the second gear;
    two rear wheel output shafts disposed in parallel below the core shaft;
    a fourth gear and a fifth gear mounted on the two rear wheel output shafts, respectively, and engaged to the right side bevel gear and the left side bevel gear, respectively; and
    two front wheel output shafts removably connected with the two rear wheel output shafts, respectively, wherein the sliding gear can be regulated to engage either the first gear or the dual tandem gear so that the propeller shaft can obtain different rotate speeds.

2. The transmission mechanism of claim 1, wherein one end of the propeller shaft is mounted within the first gear via bearings.

3. The transmission mechanism of claim 1, wherein the two front wheel output shafts are connected with the two rear wheel output shafts by two overrunning clutches, respectively.

4. The transmission mechanism of claim 3, wherein one end of the propeller shaft is mounted within the first gear via bearings.

5. The transmission mechanism of claim 3, wherein a recess is provided at the outer surface of the sliding gear.

6. The transmission mechanism of claim 1, wherein the dual tandem gear has a larger gear and a smaller gear, and the sliding gear has a first outer gear and an inner gear, wherein the larger gear can engage the first gear and the sliding gear can be regulated to engage the smaller gear with the first outer gear or to engage the first gear with the inner gear.

7. The transmission mechanism of claim 6, wherein one end of the propeller shaft is mounted within the first gear via bearings.

8. The transmission mechanism of claim 6, wherein a recess is provided at the outer surface of the sliding gear.

9. The transmission mechanism of claim 6, wherein the two front wheel output shafts are connected with the two rear wheel output shafts by two overrunning clutches, respectively.

10. The transmission mechanism of claim 9, wherein one end of the propeller shaft is mounted within the first gear via bearings.

11. The transmission mechanism of claim 9, wherein a recess is provided at the outer surface of the sliding gear.

12. The transmission mechanism of claim 9, wherein the overrunning clutch is a friction sprag type one way overrunning clutch.

13. The transmission mechanism of claim 12, wherein one end of the propeller shaft is mounted within the first gear via bearings.

14. The transmission mechanism of claim 12, wherein a recess is provided at the outer surface of the sliding gear.

* * * * *